June 8, 1937. E. L. CHAFFEE 2,083,491
TANK
Filed March 7, 1936
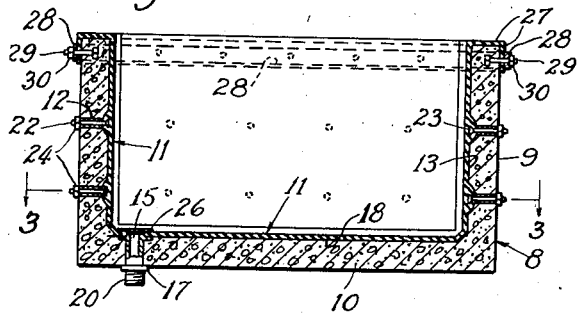
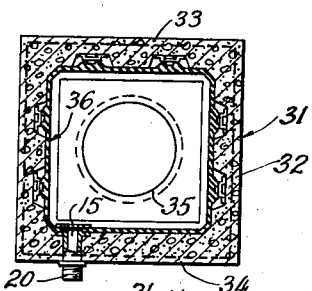
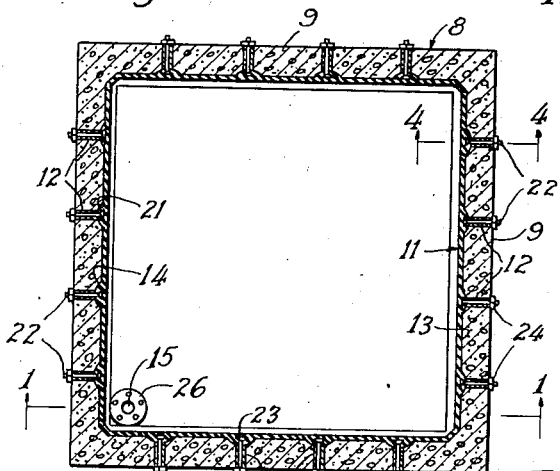
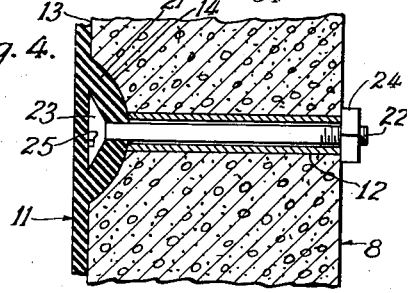
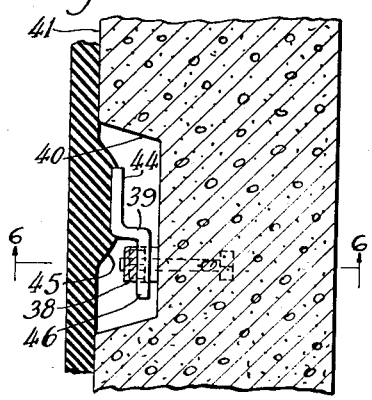
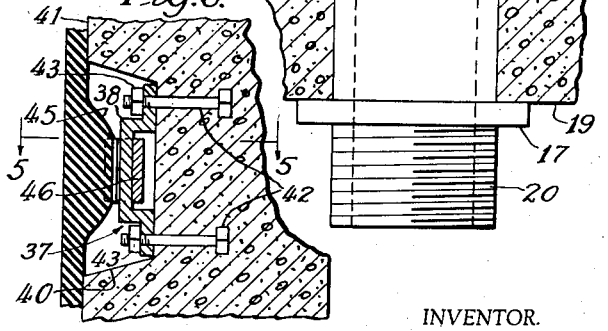
INVENTOR.
E. L. Chaffee
BY Carlos G. Stratton
ATTORNEY.

Patented June 8, 1937

2,083,491

UNITED STATES PATENT OFFICE 2,083,491

TANK

Edmund Lyman Chaffee, Pasadena, Calif.

Application March 7, 1936, Serial No. 67,580

9 Claims. (Cl. 72—14)

My invention relates to tanks, and more particularly to tanks respectively adapted for aging and for fermentation, in the production of beer.

An important object of my invention is the provision of a beer tank whose body will withstand without distortion the relatively high pressures encountered in the brewing of beer.

Another object is to provide a continuous lining for such a beer tank, which will not crack under such pressure and yet will conform to any inequalities in the inner surface of a concrete tank.

A further object is to provide efficient means for holding such a lining in place in a tank of the character mentioned.

The invention also comprises novel details of construction and novel combinations and arrangements of parts, which will more fully appear in the course of the following description.

In the drawing, like reference characters designate similar parts in the several views.

Figure 1 is a vertical section of an open tank embodying certain features of my invention, taken on the line I—I of Figure 3.

Figure 2 is a vertical section of a closed tank embodying certain features of my invention.

Figure 3 is a horizontal section taken on the line 3—3 of Figure 1.

Figure 4 is an enlarged section taken on the line 4—4 of Figure 3.

Figure 5 is an enlarged section similar to Figure 4, showing a modified holding device, taken on the line 5—5 of Figure 6.

Figure 6 is a section taken on the line 6—6 of Figure 5.

Figure 7 is an enlargement of the drain employed in both the open and closed tanks.

Referring more in detail to the drawing, the reference numeral 8 generally designates an open concrete tank, consisting of a shell of concrete and a lining 11. The shell comprises walls 9 and a floor 10 and the lining is preferably of vulcanized rubber that is acidproof and imparts substantially no taste to the beer. Two forms of mechanical fastening devices have been shown in the drawing, for fastening the lining in place. The form illustrated in Figures 1, 3, and 4 comprises a bushing 12 embedded in and extending transversely through the concrete wall 9 of the tank. The inner surface 13 of the tank wall 9 has a rounded depression 14 disposed at the inner end of each bushing 12. Embedded in the floor 10 of the tank is an acid resistant drain nipple 15 comprising flanges 16 and 17 at the inner and outer surfaces 18 and 19 of the floor 10. The nipple is threaded at 20 for connection with a drain conduit.

The rubber lining 11 completely covers the inner surfaces 13 and 18 of the walls and floor, whereby to keep the beer away from the concrete. The lining carries bosses 21 that conform with and fit in the depressions 14. Bolts 22, whose heads 23 are embedded and vulcanized in the bosses 21, project through the bushings 12. Nuts 24 are screwed on the threaded shanks of the bolts 22, whereby said bosses are drawn into their respective depressions to hold the lining tightly in place. The bolt heads may be slotted, as at 25, into which rubber may flow to aid in preventing the bolt heads from turning in the bosses 21.

An annulus 26 of acidproof material is bolted to the flange 16, pinching the rubber lining 11 therebetween, whereby to provide a fluid tight fit around the drain nipple.

The lining 11 is lapped around the top edges of the walls of the open tank 8, as indicated at 27. A hoop 28 extends around the periphery of the tank, clamping the edge of the lining in place by means of bolts 29 embedded in the concrete, and nuts 30 on the bolts.

A closed tank 31, embodying features of my invention, consists of walls 32, a top 33 and a floor 34. A manhole 35 provides access to the interior of the tank for cleaning, etc. Suitable connections may be provided to and from both the open and the closed tanks, and suitable valves may be provided in such connections. Since such connections and valves per se form no part of my invention, illustrating and describing same seem unnecessary.

For holding a lining 36 in place in the closed tank, a modified construction of fastening device 37 has been shown in Figures 2, 5, and 6. This device consists of a stirrup member 38 and a hook member 39. The stirrup members are mounted in sockets 40 at the inner surfaces 41 of the closed tank. Bolts 42 embedded in the concrete walls 32 and top 33 hold the stirrups in place in the sockets, through the intermediary of nuts 43.

Each hook member comprises a foot 44 vulcanized in a boss 45 on the outer face of the lining 36. An offset arm 46 on the hook member engages under the stirrup member 38.

It is believed clear without further illustration that a clamping ring may be placed around the manhole 35 similar to the annulus 26. It is also to be understood that the bolts 22 or fastening devices 37 may be disposed in staggered relationship, and that either mechanical fastener, 22 or 37, may be used for the lining of either the closed or open tank.

The use of my construction is thought obvious. The concrete tank 31 has sufficient strength to hold relatively large quantities of liquid and sufficient rigidity to resist distortion when confining the relatively high pressures produced in beer aging (e. g., eleven pounds pressure). Furthermore the rubber lining not only protects the beer from the solvent elements of the concrete, but is flexible and is of relatively soft, resilient rubber, which conforms to and compensates for inequalities in the inner surface of the concrete.

As a matter of record, I also wish to disclose other modifications of my invention, to wit, vulcanizing the rubber directly to the tank, whether the tank be concrete or metal, e. g., steel. In cases where the rubber lining is vulcanized to the inner surface of a concrete shell, it is preferable to vulcanize the lining in place, in order that rubber of the lining may flow into the usual voids in the surface of concrete. By this means, permanent bonds are made at a plurality of points, thus securely holding the lining in position.

In applying the lining to the closed top tank, when employing the mechanical fastening devices 37, the devices around the manhole 35 are the last ones that are hooked together. In removing the lining from the closed top tank, the hooks around the manhole are the first to be unfastened.

The open tanks are generally employed in the production of beer for fermenting, and the closed tanks for aging.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

It is to be understood that the present invention is not solely applicable to use in the production of beer, but is useful as well in the production or storage of other alcoholic beverages, such as wine. Therefore, in the present description and in the claims at the end of this specification, the term "beer" is to include other alcoholic beverages.

Having thus described my invention, what I claim and desire to secure by Letters Patent is:

1. A tank for use in the production of beer, comprising wall and floor members of concrete, a flexible, vulcanized rubber lining for the concrete tank, whereby to protect beer in the tank from the concrete and to conform to inequalities in the inner surface of the concrete, and fastening devices having members embedded in the concrete and having complementary members vulcanized in the rubber, said fastening devices maintaining the lining in position in the tank.

2. A tank for use in the production of beer, comprising wall and floor members of concrete, a flexible, vulcanized rubber lining for the concrete tank, whereby to protect beer in the tank from the concrete and to conform to inequalities in the inner surface of the concrete, bushings embedded in the concrete, bolts adapted to fit in the bushings, heads on the bolts at one end of the bushing being vulcanized in the rubber lining, and nuts on the bolts at the other end of the bushing, whereby to clamp the lining in position in the tank.

3. A tank for use in the production of beer, comprising wall and floor members of concrete, a flexible, vulcanized rubber lining for the concrete tank, whereby to protect beer in the tank from the concrete and to conform to the inequalities in the inner surface of the concrete, bushings embedded in the concrete, depressions in the inner surface of the tank, disposed at the inner ends of said bushings, bosses on the lining arranged to lie in said depressions, bolts adapted to fit in the bushings, heads on the bolts vulcanized in said bosses, and nuts on the bolts at the outer ends of the bushings, whereby to clamp the lining in position in the tank.

4. A tank for use in the production of beer, comprising wall and floor members of concrete, a flexible, vulcanized rubber lining for the concrete tank, whereby to protect beer in the tank from the concrete and to conform to the inequalities in the inner surface of the concrete, stirrup members mounted on the inner surface of the concrete walls, hook members mounted on the opposed surface of the lining, said hook and stirrup members being engaged when the lining is fastened in place to the concrete walls.

5. A tank for use in the production of beer, comprising wall and floor members of concrete, a flexible, vulcanized rubber lining for the concrete tank, whereby to protect beer in the tank from the concrete and to conform to the inequalities in the inner surface of the concrete, the walls having recesses, stirrups in the recesses, bolts embedded in the concrete walls holding the stirrups in place in the recesses, hooks having members vulcanized in the lining and having arms engaged with the stirrups when the lining is fastened in place to the concrete walls.

6. A tank for use in the production of beer, comprising wall and floor members of concrete, a flexible, vulcanized rubber lining for the concrete tank, whereby to protect beer in the tank from the concrete and to conform to inequalities in the inner surface of the concrete, the walls having recesses and the lining having bosses arranged to be received by the recesses, stirrups in the recesses, bolts embedded in the concrete walls holding the stirrups in place in the recesses, hooks having members vulcanized in said bosses and having integral arms engaged with the stirrups when the lining is fastened in place to the concrete walls.

7. A tank for use in the production of beer, the tank being reenforced with concrete and having an opening through the concrete, a flexible, substantially acidproof lining for said concrete, the lining having an opening alined with the opening in the concrete, the opening in the concrete having an acidproof lining member, and a ring clamping the flexible lining around said member in substantially liquid tight engagement, whereby to protect fluid contained in the tank from the concrete.

8. A tank for use in the production of beer, comprising wall and floor members of concrete having voids at the inner surface of the concrete, rubber lining for the tank vulcanized in place to the inner surface of the wall and floor members, and integral, rubber enlargements on the outer surface of the lining engaging said voids to provide bonds between the lining and the tank to hold the lining in position.

9. A tank for use in the production of beer, comprising wall and floor members of concrete having a soluble element exposed at the inner surfaces thereof, a flexible, rubber lining for the concrete tank to protect beer in the tank from the soluble element of the concrete, the lining conforming with said inner surfaces, and means between the body of the lining and the concrete portions of the tank holding the rubber lining against said members in conformity with said inner surfaces.

EDMUND LYMAN CHAFFEE.